United States Patent [19]
Cameron

[11] 3,790,178
[45] Feb. 5, 1974

[54] BEARING SEAL
[75] Inventor: Robert W. Cameron, Canton, Ohio
[73] Assignee: The Timken Company, Canton, Ohio
[22] Filed: Jan. 17, 1972
[21] Appl. No.: 218,440

[52] U.S. Cl. .............................. 277/95, 308/187.2
[51] Int. Cl. ............................................. F16j 15/32
[58] Field of Search ............ 277/81, 94, 95, DIG. 4; 308/187.2, 214

[56] References Cited
UNITED STATES PATENTS
2,878,084  3/1959  Bermingham ......................... 277/95
3,306,223  2/1967  Liebig ................................... 277/95

*Primary Examiner*—Robert B. Hull
*Assistant Examiner*—Robert I. Smith
*Attorney, Agent, or Firm*—Gravely, Lieder & Woodruff

[57] ABSTRACT

A seal for a tapered roller bearing includes a mounting insert having concentric axial walls interconnected by a radial wall. The inner of the two axial walls is pressed onto the thrust rib of the bearing cone until the radial wall is flush with the cone back face. Hence, the insert does not obstruct the back face of the cone and therefore has no effect on the adjustment of the bearing. An elastomeric deflection member is bonded to the free end of the outer axial wall, and this deflection member extends obliquely toward the cup front face, with which it is engaged. A dirt excluder is also bonded to the outer axial wall and projects outwardly therefrom. The outer diameter of the dirt excluder is slightly less than the outer diameter of the bearing cup so that the dirt excluder does not engage the wall of the housing bore into which the cup is fitted. Thus, friction exists only between the deflection member and cup front face so that seal drag is minimized.

11 Claims, 3 Drawing Figures

PATENTED FEB 5 1974 3,790,178

BEARING SEAL

BACKGROUND OF THE INVENTION

This invention relates in general to seals, and more particularly to lip-type seals for bearings.

To operate properly, most bearings must be provided with a supply of lubricant which is usually a grease, and this is true of tapered roller bearings, for in such a bearing the tapered rollers are positioned to bear against a thrust rib as they roll between opposed raceways. To retain lubricants within these bearings, the bearings are usually provided with some type of sealing device, and of the sealing devices currently available, perhaps the lip-type seal is most widely used. A lip-type seal is positioned on one of two parts which are rotatable relative to one another, and the lip of the seal bears against the other part. As a result, friction occurs, causing so-called seal drag.

In some applications, such as conveyor idlers, it is desirable to have seal drag at a minimum.

Lip-type bearing seals have been developed in which the elastomeric lip is carried by one of the bearing races and engages the other race so that the actual lubricant seal is generally confined to and effected within the bearing itself. U.S. Pat. No. 3,006,701 discloses such a seal used in conjunction with a tapered roller bearing. These seals occupy a minimum amount of space within the bearing assembly. A seal of that construction, however, has its elastomeric seal lips bonded to a soft steel insert which extends across the hardened cone back face, and the cone back face is of course, the face through which thrust loading is transferred. Being soft, the steel of these inserts does not remain dimensionally stable under heavy thrust loading. Indeed, it tends to decrease in thickness, and this in turn alters the bearing adjustment and creates wear problems on the seal lip.

SUMMARY OF THE INVENTION

One of the principal objects of the present invention is to provide a lip seal which mounts upon one race of a bearing and engages the other bearing race, forming a fluid seal therewith. Another object is to provide a seal of the type stated whihc produces minimum seal drag. A further object is to produce a seal of the type stated which is easy and inexpensive to manufacture. An additional object is to provide a seal of the type stated which remains clear of the back faces on the bearing races so that the seal is not subjected to thrust loading taken by the bearing and will not undergo dimensional changes, nor will its thickness affect the adjustment of the bearing. Still another object is to provide a seal which occupies a minimum amount of space within the bearing assembly. These and other objects and advantages will become apparent hereinafter.

The present invention is embodied in a seal having a mounting insert which fits over the rib on the inner race of a bearing, but does not obstruct the back face of that race. The insert projects outwardly from the rib and carries an elastomeric deflection member which is engaged with the front face on the outer race of the bearing. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
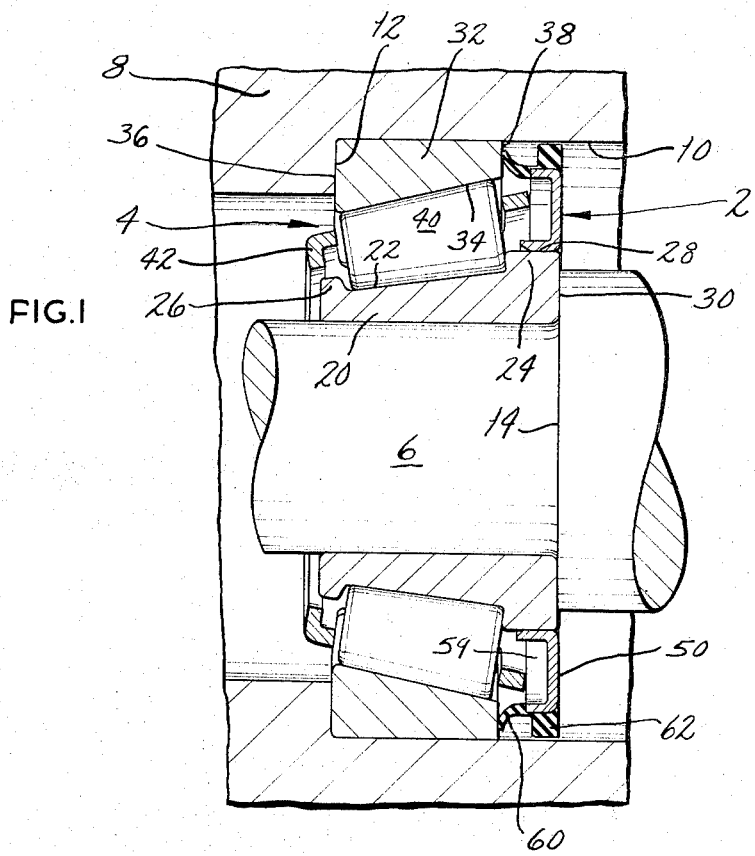
FIG. 1 is a sectional view of a tapered roller bearing provided with a seal constructed in accordance with and embodying the present invention.

Referring now to the drawings (FIG. 1),2 designates a lip-type seal for retaining a lubricant within a tapered roller bearing 4 and for further excluding dirt, water, and other contaminants from the interior of the bearing 4. The bearing 4, in turn, forms a journal for a shaft 6 within a housing 8 so that one will rotate relative to the other. The housing 8 has a bore 10 which receives the bearing 4, and this bore terminates at a shoulder 12. The shaft 6 also has a shoulder 14. Since the seal 2 is mounted on the bearing 4 it does not require any additional room in the housing bore 10. Consequently, the bore 10 may be quite shallow. Normally, two tapered roller bearings 4 are employed to effect the journal between the shaft 6 and the housing 8, and these bearings are mounted in opposition so that they can be adjusted against one another to control the axial and radial play between the shaft 6 and the housing 8.

The bearing 4 is a conventional tapered roller bearing having (FIG. 1) a cone or inner race 20 provided with an outwardly presented tapered raceway 22. At the large diameter end of its raceway 22 the cone 20 has an integrally formed thrust rib 24 provided with a generally cylindrical outer surface 28. At its small diameter end the cone 20 has an integrally formed retaining rib 26. The thrust rib 24 terminates at a cone back face 30 which is case hardened and ground square to axis of rotation for the bearing 4. The cone 20 fits over the shaft 6 with its back face 30 abutting the shaft shoulder 14.

In addition to the cone 20, the bearing 4 includes (FIG. 1) a cup or outer race 32 having an inwardly presented raceway 34 which is presented opposite to the cone raceway 22. At its small diameter end the tapered raceway 34 intersects the cup back face 36 which is case hardened and ground perpendicular to the axis of rotation. The cup back face 36 abuts the shoulder 12 of the housing 8. At its large diameter end the cup raceway 34 intersects the cup front face 38 which is also case hardened and ground perpendicular to the axis of rotation. The cup front face 38 is axially offset from the cone back face 30.

Completing the bearing 4 are (FIG. 1) a plurality of tapered rollers 40, which engage and roll along the opposed raceways 22 and 34, and a cage 42, which maintains the correct circumferential spacing between the rollers 40. The cage 42 in cooperation with the thrust and retaining ribs 24 and 26 further holds the rollers 40 against the cone 20 when the cone 20 is withdrawn from the cup 32.

The seal 2 is carried by the cone 20 at the thrust rib 24 thereof and engages the front face 38 of the cup 32. It includes (FIG. 2) a soft steel mounting insert 50 which is preferably a stamping. The insert 50 has a pair of concentric axial walls 52 and 54 joined by a radial connecting wall 56. The inner axial wall 52 fits over and extends along the cylindrical surface 28 of the thrust rib 24, its length being slightly less than the length of the outer cylindrical surface 28. The inside diameter of the inner wall 52 is also slightly less than the diameter of the cylindrical surface 28 so that an interference fit exists between the wall 52 and the cylindrical surface 28 of the thrust rib 24 when the insert 50 is pressed over the rib 24. To facilitate alignment of the wall 52 with the thrust rib 24 at the outset of the pressing operation, the leading or free end of the inner wall 52 is provided with an inwardly presented chamfer 58. The radial wall 56 extends radially outwardly beyond the cage 42 where it merges into the outer axial wall 54. The two axial walls 52 and 54 project in the same direction from the radial wall 56 and form an annular channel 59 which opens toward the large diameter end faces of the tapered rollers 40. The large diameter end of the cage 42 projects into this channel 59. The outside diameter of the outer wall 54 is somewhat less than the outside diameter of the cup 32 so that a substantial distance exists between the outer wall 54 and the wall of the housing bore 10. The insert 50 serves as a mount for a seal lip or deflection member 60 and a dirt excluder 62 which are integrally molded from a suitable elastomeric material.

Figure 2:
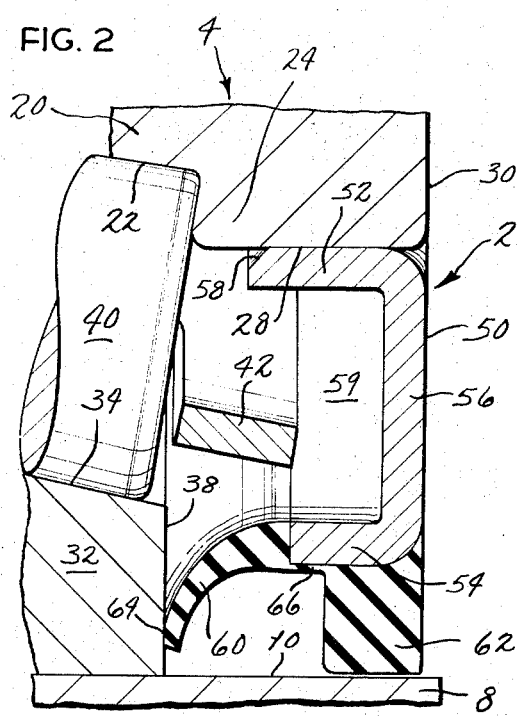
FIG. 2 is an enlarged fragmentary sectional view of the seal when mounted on the bearing cone and engaged with the bearing cup, in which case the elastomeric deflection member of the seal is deflected.

The dirt excluder 62 is bonded to the generally cylindrical outer surface of the outer axial wall 54 and projects radially therefrom toward the surface of the housing bore 10. It terminates in close proximity to the surface of the housing bore 10, but does not actually engage that surface (FIG. 2). One side of the dirt excluder 62 is flush with the exposed face of the radial connecting wall 56, while the other side is set slightly inwardly from the free end of the outer wall 54. In cross-section the dirt excluder 62 is generally rectangular. It further has substantial width so that it is not easily distorted in the axial direction, yet, being formed from an elastomer, it will yield slightly in that direction.

Figure 3:
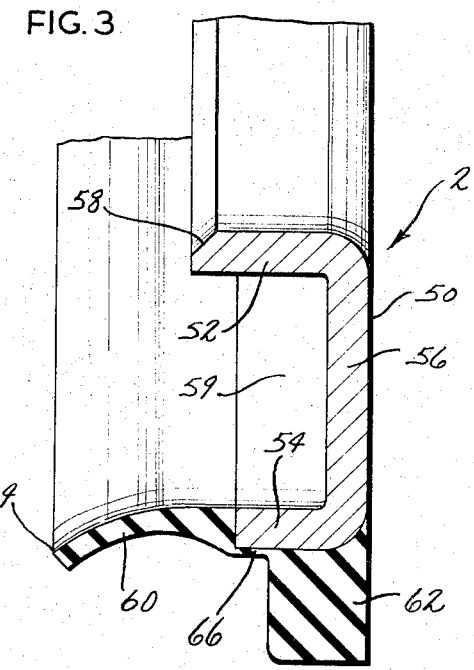
FIG. 3 is an enlarged fragmentary sectional view of the seal detached from the bearing, in which case the deflection member is not deflected.

The deflection member 60 is bonded to the squared off end face of the outer axial wall 54 and when not deflected (FIG. 3) projects generally axially therefrom. About midway between its ends, it turns slightly outwardly so that the free end of the deflection member 60 is slightly oblique to the axis of rotation for the bearing 4. At its free end, the deflection member 60 has a seal face 64 which is quite narrow and bears against the front face 38 of the cup 32. When the seal face 64 and the cup front face 38 are so engaged (FIG. 2), the deflection member 60 is deflected still further so that the natural resiliency of the elastomeric material maintains the seal face 64 engaged with the cup front face 38.

The deflection member 60 and the dirt excluder 62 are joined by the web 66 which extends along and is bonded to the outwardly presented surface of the outer wall 54. The web 66 is molded integral with members 60 and 62.

From the foregoing, it is apparent that seal 2 closes the outwardly presented end of the bearing and prevents the lubricant within the bearing from escaping and dirt, water and other contaminants from entering the bearing 4. With regard to contaminants, most of them fail to pass beyond the dirt excluder 62, but any contaminants which do pass through the small clearance between the dirt excluder 62 and the opposed surface of the housing bore 10, are prevented from entering the interior of the bearing by the deflection member 60. Likewise, the engagement of the seal face 64 of the deflection member 60 with the cup front face 38 prevents the lubricant from escaping. Since the deflection member 60 is quite flexible, it exerts very little force on the cup 32, and as a result a minimum amount of torque is required to overcome the frictional resistance between the deflection member 60 and the cup front face 38. This coupled with the fact that the seal face 64 is the only surface on the seal at which friction develops, results in a seal which produces extremely low seal drag. Also, since the end face of the insert 50 is flush with the cone back face 30, the hardened cone back face 30 seats directly against the shoulder 14 on the shaft 6. Thus, no intervening part exists which can compress and affect the adjustment of the bearing 4 or deflect the seal inwardly to effect seal drag.

This invention is intended to cover all changes and modifications of the example of the invention herein chosen for purposes of the disclosure which do not constitute departures from the spirit and scope of the invention.

What is claimed is:

1. A seal for use with a tapered roller bearing which has a cup sized to fit into a housing bore and providing a front face which lies generally in a plane perpendicular to the axis of rotation, a cone providing a thrust rib having a circumferential seat surface spaced inwardly from the cup front face, and tapered rollers between the cup and cone; said seal comprising: a seal mount carried on said seat surface of the cone rib without substantially obstructing the end face of the cone and projecting outwardly therefrom toward the wall of the housing bore; an elastomeric deflection member mounted on and projecting from the mount generally in the axial direction toward the cup front face and having a free end abutting the cup front face such that the entire deflection member is deflected outwardly; and a dirt excluder mounted on and projecting outwardly from the mount and spaced axially from the free end of the deflection member, the dirt excluder having a circumferentially extending outer face which is substantially wider than the free end of the deflection member, the diameter of the outer face on the deflection member being slightly less than the diameter of the housing bore so that the outer face will be positioned in close proximity to but will not engage the wall of the housing bore, the diameter of the outer face further being greater than the diameter of the deflection member at any point thereon irrespective of whether or not the deflection member is deflected by the cup front face.

2. A seal according to claim 1 wherein the dirt excluder is formed from an elastomeric material.

3. A seal according to claim 2 wherein the mount comprises a metal mounting insert sized to be press-fitted over the thrust rib of the cone; and wherein the deflection member and the dirt excluder are bonded to the metal mounting insert.

4. A seal according to claim 3 wherein the deflection member and dirt excluder are joined by an integrally formed elastomeric web which extends axially along the mounting insert; and wherein the deflection member, the web, and the dirt excluder are all bonded to the mounting insert along the periphery of that insert.

5. A seal according to claim 3 wherein the mounting insert has an axially extending wall which is sized to tightly embrace the rib and a radially extending wall which projects outwardly from the axial wall and is presented generally across the ends of the rollers when the axial wall embraces the rib.

6. A seal according to claim 5 wherein the mounting insert further includes another axially extending wall connected to the radial wall and located outwardly from the axially extending wall which embraces the rib, whereby one of the axial walls will be located inwardly on the bearing and the other outwardly; and wherein the deflection member is bonded to the outer axial wall.

7. A seal according to claim 6 wherein an elastomeric web is formed integral with and interconnects the deflection member and the dirt excluder; and wherein the web and dirt excluder are bonded to the outwardly presented surface of the outer axial wall, while the deflection member is bonded to the end face of the axial wall.

8. The structure according to claim 6 wherein the outer axial wall terminates at an end face presented toward the cup end face when the inner axial wall is engaged with the thrust rib; and wherein the deflection member is bonded to the end face of the outer axial wall and extends generally obliquely toward the cup front face when the inner axial wall is so positioned.

9. A seal for use with an antifriction bearing which includes an outer race sized to fit into a housing bore and having a radially extending face at one end thereof, an inner race located within the outer race and having a rib located inwardly from the front face of the outer race and a radially extending end face on the rib, and rolling elements between the two races; said seal comprising: a metal mounting insert including an axially extending wall sized to be press-fitted over the rib of the inner race without substantially obstructing the end face on the rib, and a radially directed wall connected to and projecting outwardly from the axially extending wall; an elastomeric deflection member bonded to the mounting insert outwardly from the axially extending wall thereof and extending generally axially from the mounting insert, the deflection member having a free end provided with a sealing surface positioned to engage the radially extending end face of the outer race such that the deflection member is deflected outwardly by the end face of the outer race; and a elastomeric dirt excluder bonded to the mounting insert outwardly from the axially extending wall thereof and being spaced axially from the free end of the deflection member, the dirt excluder having a circumferentially extending outer face which is substantially wider than the seal surface on the free end of the deflection member and is slightly smaller in diameter than the housing bore so that the outer face will be presented close to but will not contact the wall of the housing bore, the diameter of the outer face on the dirt excluder further being greater than the diameter of the deflection member at any point along the deflection member, both when the deflection member is deflected by the end face of the outer race and when it is not deflected.

10. A seal according to claim 8 wherein the mounting insert is further provided with another axially extending wall attached to the radially directed wall and being located directly outwardly from the axially extending wall which is press-fitted over the rib on the inner bearing race; and wherein the deflection member and the dirt excluder are bonded to the other axially extending wall.

11. A seal according to claim 10 wherein the other axially extending wall terminates at an end edge presented toward the outer race of the bearing and the deflection member is bonded to that end edge.

* * * * *